Sept. 1, 1970           W. DORN           3,526,452

OPTICAL APPARATUS

Filed June 27, 1966           3 Sheets-Sheet 3

INVENTOR.
Wolfgang Dorn
BY

United States Patent Office 3,526,452
Patented Sept. 1, 1970

3,526,452
OPTICAL APPARATUS
Wolfgang Dorn, Wedel, Holstein, Germany, assignor to
Paul Lazare, Hamburg, Germany
Filed June 27, 1966, Ser. No. 560,650
Int. Cl. G03b 37/04
U.S. Cl. 352—70
4 Claims

ABSTRACT OF THE DISCLOSURE

A method and apparatus for producing wide screen motion pictures by imparting to the film a controlled twisting into a plurality of different planes. A plurality of lens elements is provided, one for each of the different planes of the film. Each lens element has an optical axis which is perpendicular to its corresponding plane of film such that unitary source light rays pass simultaneously in each of the differing angular directions of optical axes to the differing planes of film in twisted sequence. A twisted film gate member imparts the twisting to the film in differing angular window locations.

---

The present invention relates to the filming and projecting of wide screen movie pictures. The invention is based on a heretofore known camera or projector with a plurality of objectives having associated therewith one film or picture window each. The optical axes of these objectives are arranged in such a way that the objectives will film one partial picture each of the entire width of the object or picture to be filmed in side-by-side relation and that these partial pictures are successively projected on a film strip jointly to be exposed or, in the case of a projector, that the film is projected onto a wide screen.

The heretofore known cameras and projectors of this type are so designed that they require a complicated and expensive correctional optical system in order to avoid distorted and blurred pictures due to the varying spatial location of the optical axes of the objectives with regard to the respective film or picture window.

It is, therefore, an object of the present invention to provide a camera and/or projector of the general type involved which will overcome the above-outlined drawbacks.

It is another object of the present invention to provide a camera and/or projector as set forth above in which the heretofore necessary complicated and expensive correctional optical system has been eliminated.

Still another object of the present invention consists in the provision of a motion picture camera or projector for wide-screen films which will be operable to make or project distortion and blur-free pictures without requiring complicated or expensive equipment.

It is still another object of the present invention to provide a projector for projecting a film on a wide screen which will require one light source only for a plurality of picture windows.

It is a still further object of the present invention to provide a wide-screen movie camera which will prevent unintentional exposure of adjacent film sections during the filming of a wide-screen movie picture.

These and other objects of the present invention will appear more clearly from the following specification in connection with the accompanying drawings, in which.

The camera and/or projector according to the present invention is characterized primarily in that the film or picture windows are arranged in a gate member at right angles with regard to the optical axis of the respective objective and are spaced from each other in conformity with the total length of a set of partial pictures following each other on the film strip, while the advancing mechanism of the camera or projector advances the film strip with each step by the total length of this set of partial pictures.

Thus, in conformity with the present invention with the preferred division of the picture into three partial pictures and the preferred arrangement of three objectives, the film or picture wiodows are provided in the gate member with a spacing of three picture lengths af the film and the film is advanced with each step by a distance corresponding to the length of three pictures.

Figure 1:
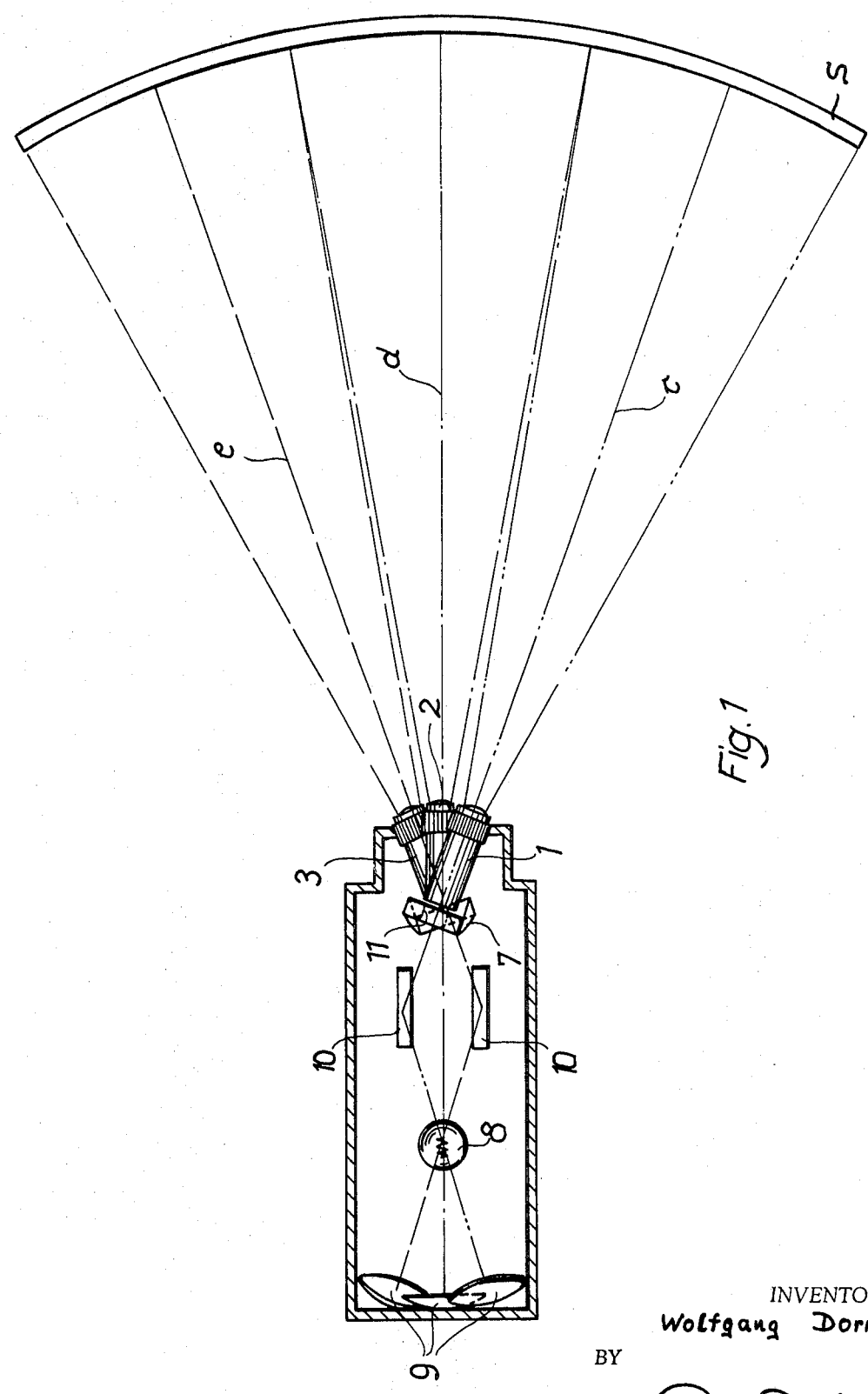
FIG. 1 shows partly in plan view and partly in section a wide-screen movie projector according to the present invention.
Figure 2:
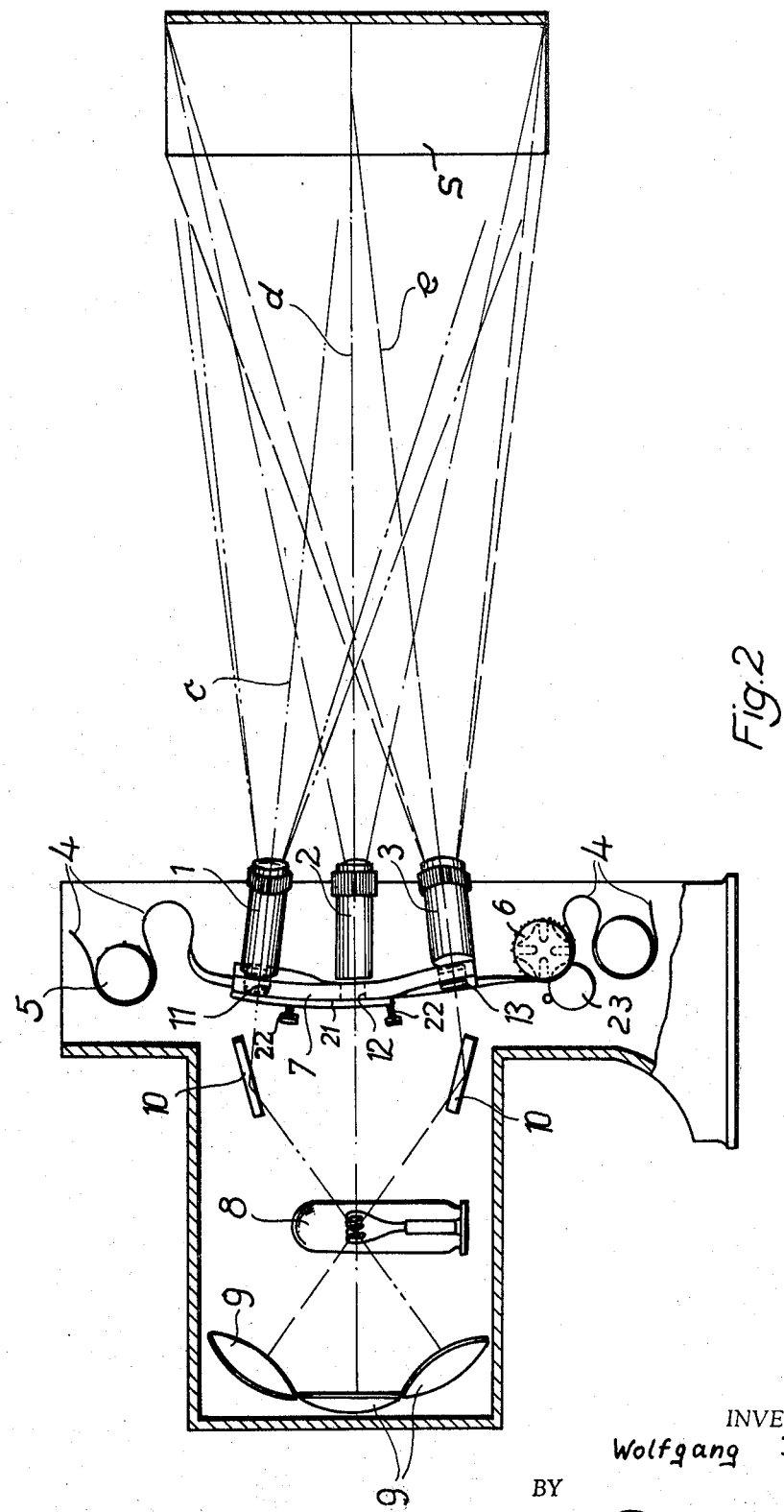
FIG. 2 illustrates partly in side view and partly in section the projector of FIG. 1.
Figure 3:
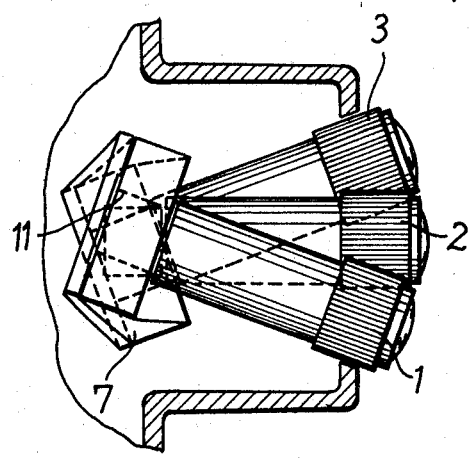
FIG. 3 shows the central portion of FIG. 1 on a larger scale than FIG. 1.
Figure 4:
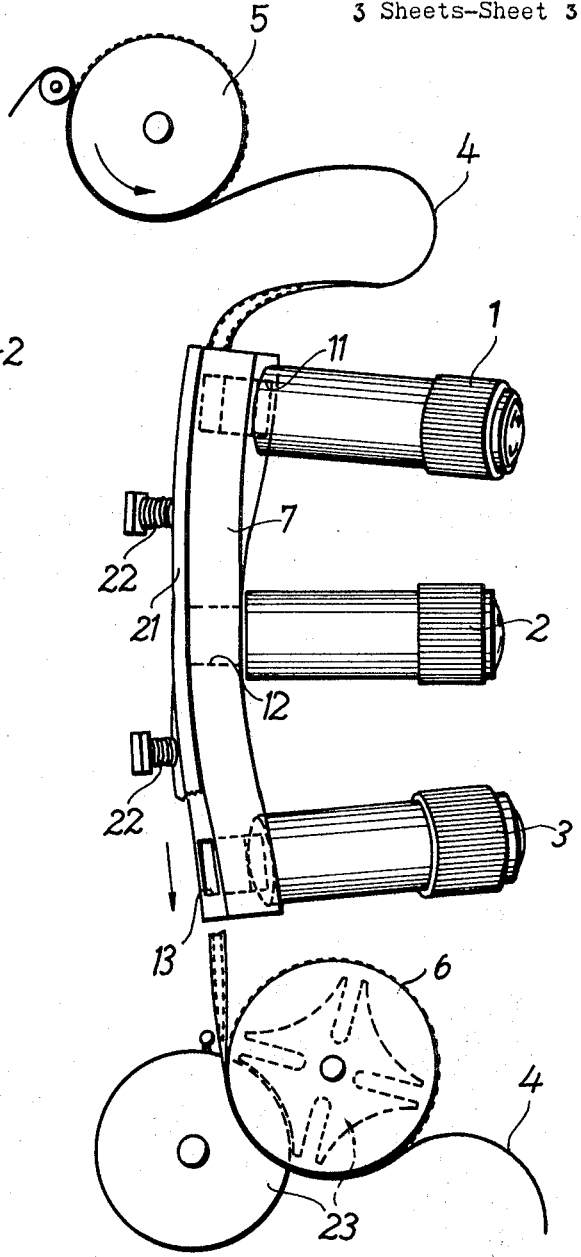
FIG. 4 shows the central portion of FIG. 2 on a larger scale than FIG. 2.
Figure 5:
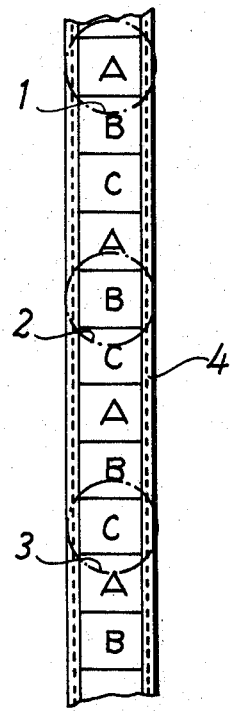
FIG. 5 illustrates the distribution of partial pictures on a film to be projected by the projector according to the invention.

Referring now to the drawings in detail, the device shown in FIGS. 1 and 2 comprises three objectives 1, 2 and 3. The optical axes $c$, $d$ and $e$ are arranged in space with regard to each other in such a way that each of the objectives covers portion of the width $b$ of the object to be filmed or to be projected, the eight of the object being $h$. The axis $d$ of the central obective 2 extends horizontally when the projector is placed on a horizontal plane, and intersects the center of the screen S so that the objective 2 covers the central third of the width $b$ and the entire height $h$ of the screen S.

The axis $c$ of the upper objective 1 of the projector is inclined and tilted in such a way that objective 1 covers the right-hand third of the screen S (see FIG. 1), whereas the optical axis $e$ of the lower objective 3 extends in such a way that objective 3 covers the left-hand third of screen S. FIG. 2 shows that all axes $c$, $d$, $e$ intersect at a point P at half the height of screen S. The angular spacing of the three axes $c$, $d$ and $e$ in a horizontal plane (FIG. 1) is such that for purposes of obtaining a uniform picture, an exact sequence of the individual pictures or a minor overlapping is assured.

Behind the objectives 1, 2 and 3 there is arranged a film gate member 7 with film or picture windows 11, 12 and 13. These picture windows 11, 12 and 13 are arranged at right angles with regard to the respective optical axis $c$, $d$ or $e$ of the respective objective. In other words, the picture windows are arranged at different angles with regard to each other so that film gate member 7 has the slightly twisted shape shown in FIG. 2. The film strip 4 to be exposed or projected winds from a spool 5 and is pulled through behind the three picture windows 11, 12 and 13 of the film gate members 7 by a toothed roller 6, which is driven in a manner known per se by an advancing mechanism in the form of a Geneva stop 23 arranged coaxially with regard to roller 6. FIG. 2 furthermore shows a pressure plate 21 for pressing film 4 against the gate member 7 through the intervention of two pressure springs 22.

When making a film, the objectives 1, 2 and 3 will respectively expose a picture A, B or C on film strip 4 while the pictures A, B and C will cast three adjacent portions of the object in series on film strip 4. Consequently, the advance of the advancing mechanism 6 is so designed that behind window 11 of gate member 7 only pictures A will be exposed, whereas behind window 12 only pictures B and behind window 13 only pictures C will be produced. In this way, the film strip 4 will have the continuously repeated sequence ABCABCABC impressed thereon while the advancing step of the advancing mechanism equals the length of three pictures and while the spacing between two picture windows each likewise equals the length of three pictures. In this way, the twisting movement to which the film strip is subjected during a movement behind the twisted film gate member 7 is respectively distributed over three pictures and therefore over a length sufficient to prevent damage of the film even at higher film advancing speeds.

Since the film or picture windows 11, 12 and 13 are located exactly perpendicularly to the optical axes c, d and e of the objectives 1, 2 and 3, an absolutely sharp and perfect picture is obtained directly without complicated and expensive deviating optical systems as for instance, prismatic members or mirorrs. In view of the spacing of the picture windows from each other, which amounts to the length of three individual or partial pictures, the exposure of the groups of pictures during the filming as well as during the projection thereof is completely free of interference.

For the projection of a movie filmed in the manner described above onto a wide screen, a projector may be employed which is basically the same in structure as the above-described camera and differs therefrom only in that the optics of the lens systems 1, 2 and 3 are designed for the projection of pictures and in that the required light source has been provided.

In conformity with the present invention, a common light source is provided for the projection of the three pictures in order to obtain a uniform lighting of the pictures of the film projected simultaneously. The rays of the light source penetrate one picture window directly and at right angles and the other two picture windows through the intervention of reflectors and deviating mirrors arranged in the housing of the projector.

More specifically, with regard to FIGS. 1 and 2, the three picture windows 11, 12 and 13 are lighted by one single light source 8. Three concave mirrors 9 which are arranged in conformity with the optical axes c, d and e of the objectives 1, 2 and 3 and two deviating mirrors 10 serve for establishing three equally strong focal points so that the film in each of the three picture windows receives the same light exposure.

In view of the arrangement of the picture windows in a gate member at right angles with regard to the axis of the respective optical system, any angular deviations and therefore, distortion and lack of sharpness of the film, is avoided so that in addition to the regular objectives no further lens or prismatic systems as correctional optical systems are required. Quite in contrast, during the filming as well as during the projection of a movie, an optically perfect reproduction of the object on a film or projection onto the wide screen is obtained. If, in conformity with the present invention the film gate member is arranged as closely as possible to the objectives, the marginal portion of the film gate member surrounding the respective picture window will absorb stray and dispersed light. Furthermore, the spacing between the picture windows in the film gate member will prevent a possible exposure of an adjacent portion of the film strip.

Still furthermore, the spacing between the picture windows distributes the twisting to which the film strip is exposed during the passage thereof behind the gate member in view of the different location of the picture windows in space, over such a length that the film is able to elastically absorb the stress to which it is exposed during the twisting, without danger of the film tearing partially or completely.

In conformity with the heretofore customary practice of dividing the total width of the wide screen into three partial pictures, the camera or projector according to the present invention may be designed similarly, i.e., with three optical systems which project or film one-third each of the total width of the screen or object. However, it is to be understood that the optical system according to the invenion may be adapted to a doubling of the width of the screen since the camera or projector according to the present invention may also be equipped with two optical systems and an advancing mechanism designed for advancing the film by steps corresponding to the length of two pictures. In a customary manner the sound track is located along the margin of the film strip. The quality of the sound reproduction is improved in view of the increased length of the sound track available per time unit.

It is, of course, to be understood that the present invention is, by no means, limited to the particular constructions shown in the drawings but also comprises any modifications within the scope of the appended claims.

What I claim is:

1. In an optical apparatus, in which a film is guided from one reel to another reel past an optical system with a plurality of objectives the optical axes of which are directed in differing angular directions to different sections of an area spaced from said apparatus: film guiding means in a twisted shape forming a twisted film guiding path with a plurality of windows therethrough respectively associated with said objectives and spaced in longitudinal direction of said twisted guiding path, the planes of said windows along said twisted guiding path respectively extending perpendicularly to and being intersected by the differing angularly directed optical axes of the objectives respectively pertaining to said windows, the spacing between the end of one window and the beginning of the adjacent window along the center line of said twisted guiding path substantially equalling the total length of said windows along said center line, and means mounted in said apparatus for stepwise advancing a film progressively past said optical system by steps each substantially equalling the total length of said windows along said center line and continuously in said twisted guiding path.

2. An optical apparatus according to claim 1, in which said film guiding means includes only a unitary film twisting gate member having windows in more than one plane in the twisted guiding path of progressive twisted transition, and light source means mounted in said apparatus and adapted to cast light transversely of each plane through said windows in each of the differing directions of the optical axes of said objectives.

3. An optical apparatus according to claim 2, which comprises a single light source arranged directly on the optical axis of only one of said objectives, and a plurality of mirror means adapted angularly to deviate light rays of said single source into differing angular relation coinciding with differing angular directions of optical axes through the windows associated with the remaining objectives.

4. In a method of moving a film from one reel to another reel past an optical system with a plurality of objectives the optical axes of which are directed in differing angular directions to different adjoining sections of an area spaced from said apparatus, the combination therewith which comprises the improvement steps of: twisting each of plural adjoining areas of the film simultaneously into differing adjoining angular planes in unidirectionally guiding said film directly along a twisted path so that the film areas respectively passing by said objectives move stepwise along planes sequentially perpendicular to the axis of the respective objective.

References Cited

UNITED STATES PATENTS

| | | | |
|---|---|---|---|
| 1,136,236 | 4/1915 | Killman | 352—70 |
| 2,142,183 | 1/1939 | De Ybarrondo. | |
| 3,038,370 | 6/1962 | Nakamatsu | 352—70 |
| 2,929,305 | 3/1960 | Blackstone. | |

FOREIGN PATENTS 1,096,308   1/1955   France.

NORTON ANSHER, Primary Examiner

M. H. HAYES, Assistant Examiner

U.S. Cl. X.R.

352—228